United States Patent [19]

Nagano

[11] 3,978,955
[45] Sept. 7, 1976

[54] AXIALLY AND RADIALLY RIGID SUPPORT PLATE FOR DIAPHRAGM CLUTCH

[76] Inventor: Tamio Nagano, 901, Horimizo, Neyagawa, Osaka, Japan

[22] Filed: Nov. 8, 1974

[21] Appl. No.: 522,302

Related U.S. Application Data

[63] Continuation-in-part of Ser. No. 331,608, Feb. 12, 1973, abandoned.

[30] Foreign Application Priority Data

Feb. 22, 1973 Japan............ 47-22042[U]

[52] U.S. Cl. .................................. 192/89 B; 85/52
[51] Int. Cl.² ........................................ F16D 13/71
[58] Field of Search ............ 192/89 B, 99 A, 70.27; 85/52; 308/222

[56] References Cited
UNITED STATES PATENTS

| | | | |
|---|---|---|---|
| 1,798,204 | 3/1931 | Howarth | 308/160 |
| 3,595,355 | 7/1971 | Maucher | 192/89 B |
| 3,811,544 | 5/1974 | Maucher | 192/89 B |

FOREIGN PATENTS OR APPLICATIONS

| | | | |
|---|---|---|---|
| 45-610 | 1/1965 | Japan | 192/89 B |
| 1,187,365 | 8/1970 | United Kingdom | 192/70.27 |
| 1,195,952 | 6/1970 | United Kingdom | 192/89 B |

Primary Examiner—Benjamin W. Wyche

[57] ABSTRACT

A support plate is secured to a clutch cover to support a diaphragm spring therebetween. The diaphragm spring is fulcrumed, at its one side face, by projections formed in the support plate. The other fulcrum is a wire ring, disposed on the other side of the diaphragm spring opposite to the support plate projections and clamped between the clutch cover and the diaphragm spring or, in alternative embodiments, is a bead or boss projecting from the clutch cover and opposed to the support plate projections.

4 Claims, 5 Drawing Figures

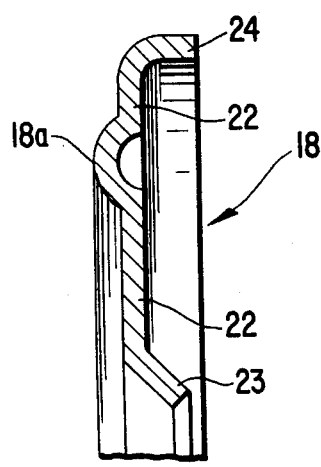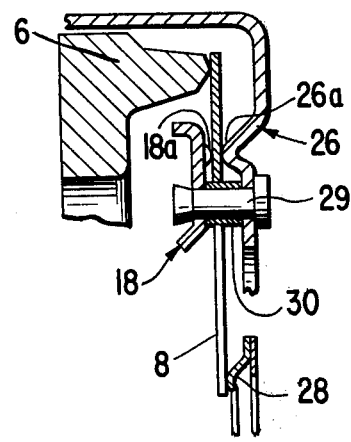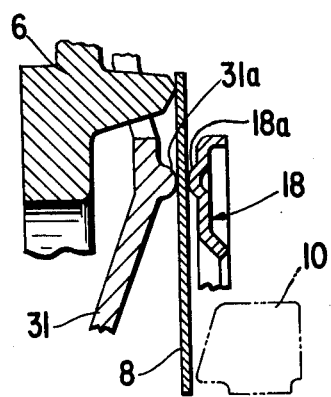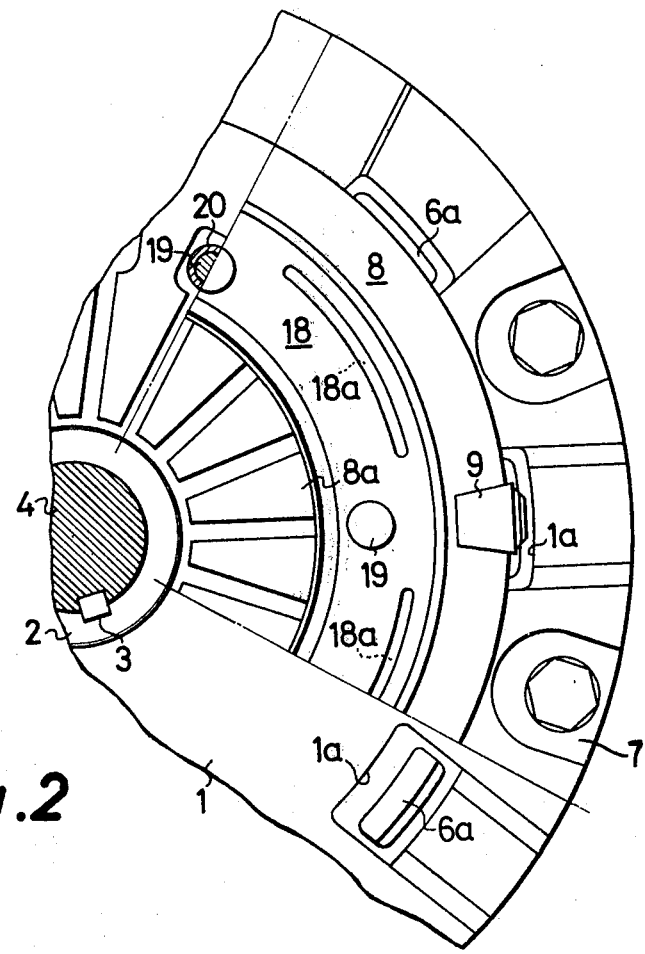

AXIALLY AND RADIALLY RIGID SUPPORT PLATE FOR DIAPHRAGM CLUTCH

This application is a continuation-in-part of application Ser. No. 331,608, filed Feb. 12, 1973, and now abandoned.

BACKGROUND OF THE INVENTION

1. Field of the Invention

The present invention relates to improvements in a diaphragm clutch, more particularly to improvements in a support structure for fulcruming the diaphragm spring serving as a release member for the engagement and disengagement of the clutch.

2. Review of the Prior Art

In the diaphragm clutch comprising a diaphragm spring having a continuous peripheral portion which functions as a dished clamping washer and a central portion which has a plurality of radial slits defining a series of fingers and is adapted to co-operate with a clutch release bearing, the diaphragm spring acts as a spring member to cause a pressure plate to clamp the friction facings of a clutch disc between the pressure plate and the flywheel for the transmission of torque during the engagement of the clutch and also serves as a release member to move the pressure plate by being acted on at its finger portion by the clutch release bearing when the bearing is shifted for the disengagement of the clutch. The diaphragm spring provides planar but somewhat conical side faces, alternately concave frontwardly toward the pressure plate or rearwardly toward a clutch cover.

In order to provide fulcrums for the diaphragm spring during both clamping and releasing movements for engagement and disengagement of the clutch, respectively, a pair of wire rings straddle the diaphragm spring intermediate the central portion and the peripheral portion and in contact with its opposite side faces, as shown in U.S. Pat. No. 3,712,436 of Rist. These rings are supported by a number of fastening members, in the form of pillars having flattened heads, which are circumannularly spaced about the drive shaft and extend through a rigidly mounted clutch cover.

However, the wire rings tend to expand radially when subjected to centrifugal action during rotation of the clutch so that the fulcrums are unevenly displaced in a radial direction, depending upon tightness of contact between the flattened pillar heads and the face of the diaphragm spring or between the other face of the diaphragm spring and the clutch cover. Generally, one ring is tightly clamped along at least a portion of its circumference so that radial expansion of the pair of rings is uneven, thereby creating a small but significant moment arm when fulcruming occurs.

Because of the fulcruming action during clutching, moreover, the portions of wire ring between these flattened heads is further subjected to bending axially, roughly in parallel to the drive shaft. In addition, the ring in contact with the pillars is free to rotate while the clutch is disengaged so that both the pillars and the ring tend to become worn. Consequently, it is difficult to retain the pair of wire rings in the predetermined accurate position over a long period of time and the displacement and deformation of the wire rings result in deterioration of the performance of the clutch.

Some of this difficulty is avoided by the construction disclosed in U.S. Pat. No. 3,499,512 of Maurice because the rearward ring is replaced by an annular bead formed in the clutch cover so that a uniform fulcrum is provided on the rearward side face of the diaphragm spring. On the other side face, however, both radial expansion and axial bending can occur between the pillars in spite of the arcuately shaped bead thereon. In order to obviate clutch deterioration, both radial and axial deformation of the fulcrum-providing ring means must be prevented.

SUMMARY OF THE INVENTION

An object of this invention is to eliminate the displacement and deformation of the ring members for fulcruming the diaphragm spring so as to permit them to remain in the predetermined accurate position over a prolonged period of time.

Another object of this invention is to simplify the support structure for fulcruming the diaphragm spring to provide the same at a low cost.

To achieve these objects, the present invention is characterized in that one of the wire rings is broadened and stiffened to become a self-supporting ring, herein termed a support plate, having annularly disposed projections which provide an annular fulcrum which functions as effectively as a wire ring but which cannot be displaced by axial bending or by radial deformation. According to one embodiment, the other wire ring can be replaced by an annular bead formed in the clutch cover, in order to provide fulcruming support to one conical side face of the diaphragm spring, while the support plate of this invention is used on the other conical side face of the diaphragm spring so that it is the only separate support ring in the clutch. In the preferred embodiment, the annular support plate is used for supporting the diaphragm spring between the support plate and the clutch cover and is formed with projections in annular arrangement in order to fulcrum the diaphragm spring in direct contact with the rearward side face of the diaphragm spring, a fully immobilized and supported wire ring being provided on the other or frontward side face of the diaphragm spring in order to fulcrum the same.

Thus to provide one of the fulcrums for the diaphragm spring directly on the support plate according to this invention, the support plate is disposed on the rearward conical side face of the diaphragm spring, and the wire ring is disposed and tightly clamped between the clutch cover and the frontward conical side face of the diaphragm spring to provide the other fulcrum. As a result, the fulcruming support members are rendered free of the influence of the radial expanding action and of the axial bending action in order to eliminate displacement and deformation thereof. The support structure for fulcruming the diaphragm spring of this invention is therefore simple in construction and is capable of remaining in the original position and shape with great ease over a prolonged period of time.

BRIEF DESCRIPTION OF THE DRAWINGS

FIG. 2 is a fragmentary side elevation of the same;

FIG. 3 is an enlarged radial cross section of the support plate shown in FIGS. 1 and 2;

FIG. 4 is a fragmentary view in vertical section, showing the support plate of this invention in combination with a clutch cover which has an annular bead formed therein as the rearward fulcrum means and which is disposed rearwardly of the diaphragm spring; and FIG. 5 is a fragmentary view in vertical section, similar to a portion of FIG. 1, showing the support plate of this invention in combination with a clutch cover which has an annular bead formed therein as the frontward fulcrum means and which is disposed frontwardly of the diaphragm spring.

DESCRIPTION OF THE PREFERRED EMBODIMENT

Figure 1:
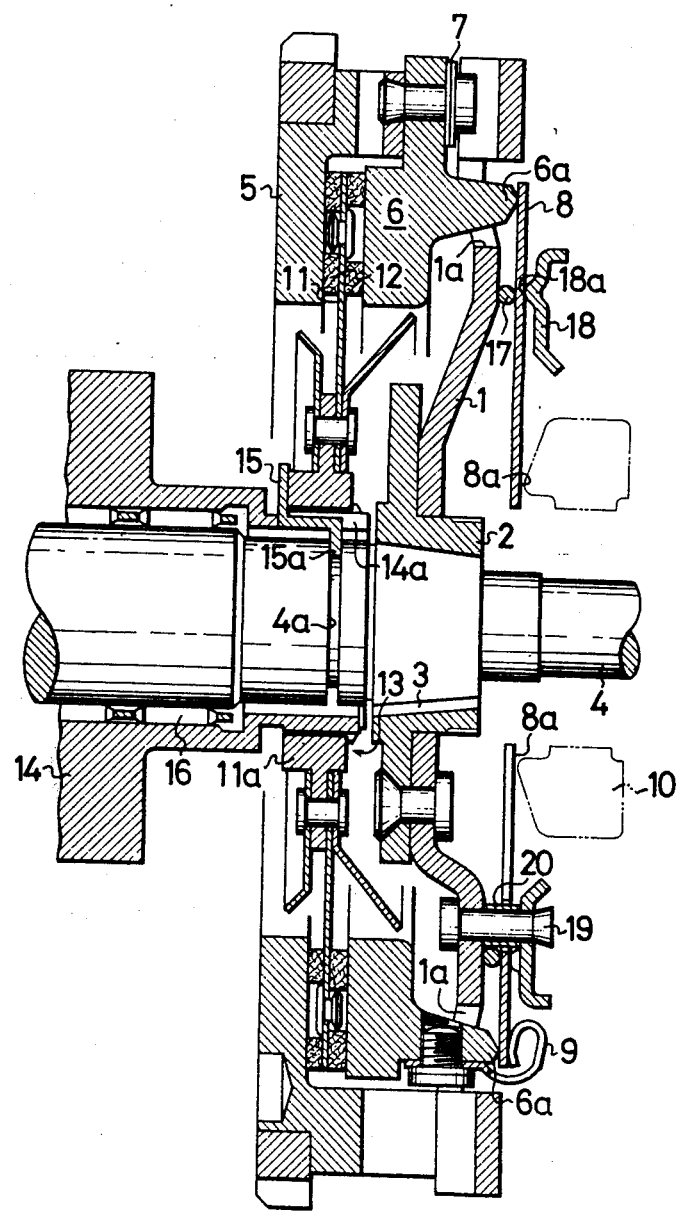
FIG. 1 is a view in vertical section showing an embodiment of this invention.

With reference to the drawings, a clutch cover 1 is secured at its inner peripheral portion to a boss 2 or the like which is mounted by means of a key 3 on a drive shaft 4 for rotation therewith. The clutch cover 1 is further fixed at its outer peripheral portion to a flywheel 5.

A pressure plate 6 is connected at several portions along its outer periphery to the clutch cover 1 by strap plates 7 and is thereby supported by the assembly of the clutch cover 1 and the flywheel 5 so as to be movable only in the axial direction. The pressure plate 6 is provided on its rear face with protrusions 6a arranged at several positions along its circumference. The protrusions 6a extend rearwardly from windows 1a formed in the clutch cover 1. The outer periphery of the frontward conical side face of the diaphragm spring 8 rests on the rearwardmost portions of the protrusions 6a. Clips 9 fixed to the pressure plate 6 retain the diaphragm spring 8 in position.

As will be described later, the diaphragm spring 8 is supported on the clutch cover 1 by a fulcruming member and, in its normal state, urges the pressure plate 6 toward the flywheel 5, whereas when pushed frontwardly, i.e., to the left as seen in FIG. 1, by a release bearing 10 at a finger portion 8a radially extending from its inner periphery, the spring 8 acts reversely to move the pressure plate 6 away from the flywheel 5.

Positioned between the flywheel 5 and the pressure plate 6 are friction facings 12 held to the outer periphery of a clutch disc 11. When the pressure plate 6 is forced toward the flywheel 5, the friction facings 12 are clamped between the plate 6 and the flywheel 5 to transmit torque from the drive shaft 4 to the driven shaft 14 by virtue of the resulting frictional contact. If the pressure plate 6 is forced away from the flywheel 5, the friction facings are freed from the clamping engagement to interrupt the transmission of the torque.

The clutch disc 11 is provided with a spline hub 11a fixed to its inner periphery and splined as at 13 to the driven shaft 14 and is movable only in the axial direction. Accordingly, while the clutch is in its engaged state with the friction facings 12 clamped between the flywheel 5 and the pressure plate 6 under pressure, the torque of the drive shaft 4 is delivered to the driven shaft 14, whereas if the clutch is freed from the clamping force for disengagement, the torque is not transmitted.

A stopper 15 for limiting the position of the clutch disc 11 when it is brought frontward is retained in place with its one portion engaged in a slit 14a formed in the driven shaft 14 axially thereof and has an end 15a engaged in a circumferential groove 4a formed in the drive shaft 4, the stopper thus being slidable only in the circumferential direction with respect to the drive shaft 4. The upper end of the stopper 15 opposes the end face of the spline hub 11a. The driven shaft 14 is mounted on the drive shaft 4 with a needle bearing 16 interposed therebetween, one being rotatable independently of the other.

The diaphragm spring 8 is fulcrumed by supporting members which provide localized annular contact for rocking the spring 8 rearwardly and frontwardly, when pushed and released, respectively by the release bearing 10 for the engagement and disengagement of the clutch and which support the spring 8 on the clutch cover 1.

In the preferred embodiment as shown in FIGS. 1 and 2, an endless or split wire ring 17 is disposed between the diaphragm spring 8 and the clutch cover 1, concentrically of the clutch. An annular support plate 18, disposed on the other side of the diaphragm spring 8, is formed with annular projections 18a positioned on the same circumference as the wire ring 17 and projecting toward the diaphragm spring 8. The support plate 18 if fastened to the clutch cover 1 by fastening members 19 at annularly spaced fastening positions to press and clamp the wire ring 17 and the projections 18a into contact with the frontward side face and the rearward side face of the diaphragm spring 8, respectively, at the middle periphery of the diaphragm spring 8. The wire ring and the projections 18a thus fulcrum the spring 8.

The support plate 18 is preferably as light as possible in order to reduce the mass that must be moved axially by the spring 8. As shown in detail in FIG. 3, the support plate 18 comprises the annular projections 18a, the radially extending annular flat base 22 on either side of the projections 18a, and the inner lip 23 and the outer lug 24 which are spaced apart by the base 22. The radially measured width of the support plate 18, from lip 23 to lug 24 prevents radial expansion of the support plate 18, and the axial extensions of the lip 23 and the lug 24 combine to inhibit axial bending of the support plate 18.

The projections 18a are formed by a press and may be discontinuous as illustrated between the fastening portions or, alternatively, they may be in the form of a circumferentially continuous projection. Indicated at 20 is a spacer at the fastening portion. Several fastening portions are of course provided on the same circumference.

Being thus fulcrumed by the wire ring 17 and the projections 18a, the diaphragm spring 8 in the preferred embodiment shown in FIGS. 1 and 2 can be operated satisfactorily by a clutch engaging or disengaging action without permitting the projections 18a to be displaced or expanded, either axially or radially. Furthermore, since the wire ring 17 is positioned on the frontward conical side face of the reversely springingly operable diaphragm spring 8 in its normal state and is tightly clamped between the spring 8 and the clutch cover 1 by the fastening member 19, the wire ring 17 is likewise prevented from displacement and expansion.

An alternative embodiment is shown in FIG. 4 wherein the same support plate 18 and diaphragm spring 8 are combined with an outside clutch cover 26, which is disposed rearwardly of the diaphragm spring 8 and comprises an annular bead or boss 26a as disclosed in U.S. Pat. No. 3,499,512. The fulcruming members which enable the outer periphery of the diaphragm spring 8 to move axially, away from the pressure plate 6 when urged by the declutching means 28 or toward the pressure plate 6 when released by the declutching means 28, therefore consist of the projections 18a on the frontward side of the diaphragm spring 8 and the boss 26a on the rearward side of the spring 8. By this combination, the entire wire ring 17 which is shown in FIGS. 1 and 2 is eliminated, and there is no part having such structural weakness that axial bending or radial deformation can occur, even at high speeds.

Another embodiment is shown in FIG. 5 wherein the same support plate 18 and diaphragm spring 8 are combined with a clutch cover 31 which is formed and disposed exactly like the clutch cover 1 in FIGS. 1 and 2 except that it also comprises an annular bead 31a which is disposed opposite to the projectons 18a on the support plate 18 and replaces the keeper ring 17 as to location, width, and extent of shaftwise projection. In this embodiment as shown in FIG. 5, the wire ring 17 is also eliminated, and there is no part or member having such structural weakness that either fulcruming member 18a, 31a can be displaced in parallel to the shaft 4 (i.e., axially) or radially.

Using any of three embodiments described hereinbefore, with the axially and radially rigid support plate of this invention, the support structure for fulcruming the diaphragm spring is simplified at a low cost, displacement and deformation of the fulcrum members are eliminated, and the diaphragm spring is enabled to remain in the predetermined accurate position over a prolonged period of time.

While preferred embodiments have been shown and described, many modifications thereof can be made by one skilled in the art without departing from the spirit and scope of the invention so that what is desired to be protected by Letters Patent should be construed only according to the scope of the following claims.

What is claimed is:

1. In a diaphragm clutch comprising, in combination: a clutch cover rotatable with a drive shaft having a central axis; a pressure plate, having a rear face and a plurality of rearwardly extending protrusions on said rear face, which is supported by said clutch cover and is axially movable only; a reversely springingly operable diaphragm spring, having a frontward conical side face and a rearward conical side face, which bears at the outer periphery of said frontward conical side face against said plurality of protrusions and is supported on said clutch cover so as to urge said pressure plate toward a flywheel in its normal state; and a fulcrum means which is in contact with the middle periphery of one conical side face of said diaphragm spring, the improvement comprising an axially and radially rigid support plate formed of a single integral piece of sheet material and for pivotally supporting a clutch diaphragm spring which comprises rigidifying means that combine to prevent radial expansion of said support plate and to inhibit axial bending of said support plate, said means consisting of:

A. a radially extending annular flat base having a circumferential inner edge and a circumferential outer edge;

B. an axially extending inner annular lip which is rigidly attached to said inner edge;

C. an axially extending outer annular flange which is rigidly attached to said outer edge; and D. an axially extending projection which is positioned on the same circumference as said fulcrum means and which projects axially toward said diaphragm spring and in the opposite axial direction to both said lip and said flange, said projection being in direct contact with said middle periphery of the other side face of said diaphragm spring, and said fulcrum means and said projection providing opposed fulcrums for said diaphrgam spring, whereby said diaphragm spring can be operated satisfactorily without permitting said fulcrums to be displaced axially or expanded radially.

2. The diaphragm clutch of claim 1 wherein said fulcrum means is an annular wire ring which is interposed between said clutch cover and said diaphragm spring, said one conical side face being said frontward conical side face and said other side face being said rearward conical side face.

3. An axially and radially rigid support plate formed of a single integral piece of sheet material and for pivotally supporting a clutch diaphragm spring, comprising:

A. an axially extending annular projection;

B. a radially extending annular flat base, having a circumferential inner edge and a circumferential outer edge, which is rigidly attached to and is disposed on either side of said projecton, so that said projection extends in one axial direction from said base;

C. an axially extending inner annular lip which is rigidly attached to said inner edge and extends oppositely to said one axial direction; and D. an axially extending outer annular flange which is rigidly attached to said outer edge and extends oppositely to said one axial direction, said inner lip and said outer flange being radially spaced apart by said flat base, whereby the radially measured width of said support plate, from said inner lip to said outer flange, prevents radial expansion of said support plate and the axial extensions of said inner lip and of said outer flange combine to inhibit axial bending of said support plate.

4. The support plate of claim 3 wherein said annular projection is circumferentially continuous projection.

* * * * *